US012512570B2

(12) United States Patent
Pan et al.

(10) Patent No.: US 12,512,570 B2
(45) Date of Patent: Dec. 30, 2025

(54) TUNABLE PHASE SHIFTER AND ELECTRONIC DEVICE

(71) Applicant: BOE Technology Group Co., Ltd., Beijing (CN)

(72) Inventors: Cheng Pan, Beijing (CN); Shiqiao Zhang, Beijing (CN); Jia Fang, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 249 days.

(21) Appl. No.: 18/271,101

(22) PCT Filed: Jul. 26, 2022

(86) PCT No.: PCT/CN2022/107976
§ 371 (c)(1),
(2) Date: Jul. 6, 2023

(87) PCT Pub. No.: WO2024/020792
PCT Pub. Date: Feb. 1, 2024

(65) Prior Publication Data
US 2024/0387968 A1 Nov. 21, 2024

(51) Int. Cl.
*H01P 1/18* (2006.01)

(52) U.S. Cl.
CPC .................................... *H01P 1/184* (2013.01)

(58) Field of Classification Search
CPC .. H01P 1/184; H01P 1/18; H01P 1/181; H01P 1/182; H01P 1/20; H01P 3/08;
(Continued)

(56) References Cited

U.S. PATENT DOCUMENTS

2008/0048800 A1 2/2008 Dutta
2013/0015925 A1 1/2013 Shiue et al.
(Continued)

FOREIGN PATENT DOCUMENTS

CN 101707271 A 5/2010
CN 203721852 U 7/2014
(Continued)

OTHER PUBLICATIONS

Deo, P. et al., Development of 60 GHz Phased Antenna Arrays Using Liquid Crystal Phase-shifters, School of Computer Science and Electronic Engineering, University of Essex, IEEE Xplore, 2013. (4 pages).
Yeh, C, et al., A New Common-Mode Noise Reduction Scheme for Weakly Coupled Differential Serpentine Delay Microstrip Lines, Department of Electronic Engineering and Master Program in Communication Engineering, Chung Yuan Christian University, Taiwan, IEEE Xplore, 2014. (4 pages).
(Continued)

*Primary Examiner* — John W Poos
(74) *Attorney, Agent, or Firm* — WHDA, LLP

(57) ABSTRACT

The present application provides a tunable phase shifter and an electronic device, which relates to the technical field of microwave radio frequency. The tunable phase shifter includes: a first substrate and a second substrate; and a regulatable dielectric layer. The first electrode layer includes a reference electrode. The second electrode layer includes a first transmission line and a second transmission line, the first transmission line is provided with a first branch, the second transmission line is provided with a second branch, and the orthographic projections on the first substrate of the first branch and the second branch and the orthographic projection of the reference electrode on the first substrate at least partially overlap. The tunable phase shifter according to the present application forms an electric field by using the first branch, the second branch and the reference electrode, which can realize the function of phase shifting.

17 Claims, 6 Drawing Sheets

(58) Field of Classification Search
CPC .... H01P 5/10; H01P 3/12; H01P 1/047; H01P 11/00; H01P 3/081; H01P 3/085; H01P 5/028; H01P 5/12; H01P 1/2039; H01P 11/003; H01P 3/00; H01P 3/003; H01P 5/187; H01P 1/10; H01P 1/203; H01P 5/19; H01P 1/185; H01Q 3/36; H01Q 1/50; H01Q 1/38; H01Q 21/065; H01Q 3/44; H01Q 3/34; H01Q 9/0457; H01Q 1/22; H01Q 1/36; H01Q 3/30; H01Q 9/0407; H01Q 21/0006; H01Q 3/26; H01Q 9/0414; H01Q 9/045; H01Q 1/48; H01Q 21/00; H01Q 21/0075; H01Q 23/00; H01Q 1/02; H01Q 21/0087; H01Q 21/08; H01Q 21/06; H01Q 21/245; H01Q 3/38; H01Q 9/0442; H01Q 1/002; H01Q 1/24; H01Q 1/52; H01Q 1/00; H01Q 1/2283; H01Q 1/243; H01Q 13/206; H01Q 15/14; H01Q 15/24; H01Q 21/064; H01Q 21/24; H01Q 9/04; H01Q 13/00; H01Q 13/20; H01Q 15/0013; H01Q 15/002; H01Q 15/0086; H01Q 19/185; H01Q 21/30; H01Q 5/307; H01Q 5/321; H01Q 9/16; H01Q 9/285; H01Q 1/246; H01Q 1/526; H01Q 13/08; H01Q 15/0066; H01Q 15/148; H01Q 19/10; H01Q 21/061; H01Q 21/062
See application file for complete search history.

(56) References Cited

U.S. PATENT DOCUMENTS

| | | | | |
|---|---|---|---|---|
| 2021/0080765 | A1* | 3/2021 | Hu | H01P 1/184 |
| 2022/0006165 | A1* | 1/2022 | Jia | H01P 1/20 |
| 2022/0006166 | A1* | 1/2022 | Li | H01P 1/18 |

FOREIGN PATENT DOCUMENTS

| | | | |
|---|---|---|---|
| CN | 106921011 | A | 7/2017 |
| CN | 107453013 | A | 12/2017 |
| CN | 108563050 | A | 9/2018 |
| CN | 111668603 | A | 9/2020 |
| CN | 111740200 | A | 10/2020 |
| CN | 112436247 | A | 3/2021 |
| CN | 113451718 | A | 9/2021 |
| CN | 216120679 | U | 3/2022 |
| EP | 3745526 | A1 | 12/2020 |
| KR | 20030004221 | A | 1/2003 |

OTHER PUBLICATIONS

Colom, P. et al., Design of Differential Delay Lines in Low Temperature Cofired Ceramics, Research & development and innovation department, Spain, IEEE Xplore, 2016. (4 pages).

* cited by examiner

TUNABLE PHASE SHIFTER AND ELECTRONIC DEVICE

TECHNICAL FIELD

The present application relates to the technical field of microwave radio frequency, and particularly relates to a tunable phase shifter and an electronic device.

BACKGROUND

Phase shifters are extensively applied in microwave radio-frequency circuits, and there are many types of them, for example, phase shifters based on Co Planar Waveguide (CPW), phase shifters based on Micro-Electro-Mechanical System (MEMS) switches, and phase shifters based on microstrip lines. Among them, the phase shifters based on microstrip lines, because of their advantages such as a simple structure and easy processing, have been studied more extensively.

SUMMARY

The embodiments of the present application employ the following technical solutions:

In an aspect, an embodiment of the present application provides a tunable phase shifter, wherein the tunable phase shifter includes:

- a first substrate and a second substrate, wherein the first substrate and the second substrate face each other;
- a regulatable dielectric layer provided between the first substrate and the second substrate;
- a first electrode layer provided between the first substrate and the regulatable dielectric layer, wherein the first electrode layer includes a reference electrode; and
- a second electrode layer provided between the second substrate and the regulatable dielectric layer, wherein the second electrode layer includes a first transmission line and a second transmission line, the first transmission line is provided with a first branch, the second transmission line is provided with a second branch, and orthographic projections on the first substrate of the first branch and the second branch and an orthographic projection of the reference electrode on the first substrate at least partially overlap.

Optionally, the first electrode layer is used as the reference electrode, and the orthographic projection of the reference electrode on the first substrate and an orthographic projection of the regulatable dielectric layer on the first substrate at least partially overlap.

Optionally, the reference electrode is provided at a whole surface.

Optionally, the reference electrode has a plurality of penetrating grooves, and an outer contour of an orthographic projection of the first transmission line on the first substrate and an outer contour of an orthographic projection of the second transmission line on the first substrate at least partially coincide with regions encircled by orthographic projections of outer contours of the grooves on the first substrate.

Optionally, at least some of the grooves are communicated.

Optionally, each two neighboring instances of the grooves are separated, two neighboring instances of the grooves share one supporting part, and part of an area of the supporting part serves as side walls of the grooves.

Optionally, an orthographic projection on the first substrate of a part of the first branch that is connected to the first transmission line and an orthographic projection on the first substrate of a part of the second branch that is connected to the second transmission line at least partially overlap with an orthographic projection of the supporting part on the first substrate.

Optionally, both of an outer contour of the orthographic projection on the first substrate of the part of the first branch that is connected to the first transmission line and an outer contour of the orthographic projection on the first substrate of the part of the second branch that is connected to the second transmission line coincide with an outer contour of the orthographic projection of the supporting part on the first substrate.

Optionally, both of outer contours of the orthographic projections on the first substrate of the first branch and the second branch coincide with an outer contour of the orthographic projection of the reference electrode on the first substrate.

Optionally, a direction of extension of the first transmission line and a direction of extension of the second transmission line are the same; and

- the first transmission line includes at least one first sub-transmission-line group, and the second transmission line includes at least one second sub-transmission-line group.

Optionally, the first sub-transmission-line group includes two first sub-transmission lines, each of the first sub-transmission lines includes a first end and a second end, and the second end of one of the first sub-transmission lines and the second end of the other of the first sub-transmission lines are directly connected; and

- the second sub-transmission-line group includes two second sub-transmission lines, each of the second sub-transmission lines includes a third end and a fourth end, and the fourth end of one of the second sub-transmission lines and the fourth end of the other of the second sub-transmission lines are directly connected.

Optionally, each of the first sub-transmission lines includes a first line segment, a second line segment and a third line segment, and the first line segment is electrically connected to the third line segment by the second line segment;

- an included angle between a direction of extension of the first line segment and a direction of extension of the second line segment is unequal to an included angle between a direction of extension of the third line segment and the direction of extension of the second line segment;
- each of the second sub-transmission lines includes a fourth line segment, a fifth line segment and a sixth line segment, and the fourth line segment is electrically connected to the sixth line segment by the fifth line segment; and
- an included angle between a direction of extension of the fourth line segment and a direction of extension of the fifth line segment is unequal to an included angle between a direction of extension of the sixth line segment and the direction of extension of the fifth line segment.

Optionally, the included angle between the direction of extension of the first line segment and the direction of extension of the second line segment is greater than the included angle between the direction of extension of the third line segment and the direction of extension of the second line segment; and the included angle between the direction of extension of the fourth line segment and the direction of extension of the fifth line segment is greater than the included angle between the direction of extension of the sixth line segment and the direction of extension of the fifth line segment.

Optionally, each of the first sub-transmission lines includes a first line segment, a second line segment and a third line segment, and the first line segment is electrically connected to the third line segment by the second line segment;

an included angle between a direction of extension of the first line segment and a direction of extension of the second line segment is equal to an included angle between a direction of extension of the third line segment and the direction of extension of the second line segment;

each of the second sub-transmission lines includes a fourth line segment, a fifth line segment and a sixth line segment, and the fourth line segment is electrically connected to the sixth line segment by the fifth line segment; and an included angle between a direction of extension of the fourth line segment and a direction of extension of the fifth line segment is equal to an included angle between a direction of extension of the sixth line segment and the direction of extension of the fifth line segment.

Optionally, the direction of extension of the second line segment is different from both of the direction of extension of the first line segment and the direction of extension of the third line segment; and the direction of extension of the fifth line segment is different from both of the direction of extension of the fourth line segment and the direction of extension of the sixth line segment.

Optionally, the second line segment directly contacts both of the first line segment and the third line segment; and the fifth line segment directly contacts both of the fourth line segment and the sixth line segment.

Optionally, the direction of extension of the first line segment and the direction of extension of the third line segment are parallel, and the direction of extension of the second line segment is perpendicular to both of the direction of extension of the first line segment and the direction of extension of the third line segment; and the direction of extension of the fourth line segment and the direction of extension of the sixth line segment are parallel, and the direction of extension of the fifth line segment is perpendicular to both of the direction of extension of the fourth line segment and the direction of extension of the sixth line segment.

Optionally, the first sub-transmission line further includes a first turning corner and a second turning corner, one end of the second line segment is electrically connected to the first line segment by the first turning corner, and the other end is electrically connected to the third line segment by the second turning corner; and the second sub-transmission line further includes a third turning corner and a fourth turning corner, one end of the fifth line segment is electrically connected to the fourth line segment by the third turning corner, and the other end is electrically connected to the sixth line segment by the fourth turning corner.

Optionally, a width in a first direction of an orthographic projection of the second line segment on the first substrate is greater than both of widths in a second direction of orthographic projections of the first line segment and the third line segment on the first substrate;

a width in the first direction of an orthographic projection of the fifth line segment on the first substrate is greater than both of widths in the second direction of orthographic projections of the fourth line segment and the sixth line segment on the first substrate; and the first direction and the second direction are perpendicular.

Optionally, a radius of a contour of one side of the first turning corner that is away from the second sub-transmission line and a radius of a contour of one side of the second turning corner that is close to the second sub-transmission line are equal, and a radius of a contour of one side of the first turning corner that is close to the second sub-transmission line and a radius of a contour of one side of the second turning corner that is away from the second sub-transmission line are equal; and a radius of a contour of one side of the third turning corner that is away from the first sub-transmission line and a radius of a contour of one side of the fourth turning corner that is close to the first sub-transmission line are equal, and a radius of a contour of one side of the third turning corner that is close to the first sub-transmission line and a radius of a contour of one side of the fourth turning corner that is away from the first sub-transmission line are equal.

Optionally, a radius of a contour of one side of the first turning corner that is away from the second sub-transmission line is less than a radius of a contour of one side of the second turning corner that is close to the second sub-transmission line; and a radius of a contour of one side of the third turning corner that is close to the first sub-transmission line is greater than a radius of a contour of one side of the fourth turning corner that is away from the first sub-transmission line.

Optionally, the radius of the contour of the side of the first turning corner that is away from the second sub-transmission line is less than the radius of the contour of the side of the fourth turning corner that is away from the first sub-transmission line, and the radius of the contour of the side of the second turning corner that is close to the second sub-transmission line is greater than the radius of the contour of the side of the third turning corner that is close to the first sub-transmission line.

Optionally, the radius of the contour of the side of the first turning corner that is away from the second sub-transmission line and the radius of the contour of the side of the fourth turning corner that is away from the first sub-transmission line are equal, and the radius of the contour of the side of the second turning corner that is close to the second sub-transmission line and the radius of the contour of the side of the third turning corner that is close to the first sub-transmission line are equal.

Optionally, the radius of the contour of the side of the third turning corner that is close to the first sub-transmission line is greater than a radius of a contour of one side of the third turning corner that is away from the first sub-transmission line; and a radius of a contour of one side of the fourth turning corner that is close to the first sub-transmission line is less than the radius of the contour of the side of the fourth turning corner that is away from the first sub-transmission line.

Optionally, the radius of the contour of the side of the first turning corner that is away from the second sub-transmission line and a radius of a contour of one side of the first turning corner that is close to the second sub-transmission line are equal, and the radius of the contour of the side of the second turning corner that is close to the second sub-transmission line and a radius of a contour of one side of the second turning corner that is away from the second sub-transmission line are equal; and a radius of a contour of one side of the third turning corner that is away from the first sub-transmission line and the radius of the contour of the side of the third turning corner that is close to the first sub-transmission line are equal, and a radius of a contour of one side of the fourth turning corner that is close to the first sub-transmission line and the radius of the contour of the side of the fourth turning corner that is away from the first sub-transmission line are equal.

Optionally, the radius of the contour of the side of the first turning corner that is away from the second sub-transmission line is less than a radius of a contour of one side of the first turning corner that is close to the second sub-transmission line, and the radius of the contour of the side of the second turning corner that is close to the second sub-transmission line is less than a radius of a contour of one side of the second turning corner that is away from the second sub-transmission line; and a radius of a contour of one side of the third turning corner that is away from the first sub-transmission line is less than the radius of the contour of the side of the third turning corner that is close to the first sub-transmission line, and a radius of a contour of one side of the fourth turning corner that is close to the first sub-transmission line is less than the radius of the contour of the side of the fourth turning corner that is away from the first sub-transmission line.

Optionally, in an orthographic projection of one of the first sub-transmission lines on the first substrate and an orthographic projection on the first substrate of one of the second sub-transmission lines in a same direction of extension as the first sub-transmission line, a spacing W0 of the fourth line segment from the third line segment in the second direction satisfies $W0>S+2\times W$;

where S is a spacing in the second direction between an orthographic projection of the first sub-transmission line on the first substrate and an orthographic projection of the second sub-transmission line on the first substrate, and W is a width in the second direction of the orthographic projection of the first sub-transmission line on the first substrate.

Optionally, the regulatable dielectric layer includes a dielectric, and a dielectric constant of the dielectric is greater than or equal to 1.

In another aspect, an embodiment of the present application provides an electronic device, and the electronic device includes the tunable phase shifter stated above.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are merely embodiments of the present application, and a person skilled in the art can obtain other figures according to these figures without paying creative work.

DETAILED DESCRIPTION

Figure 1:
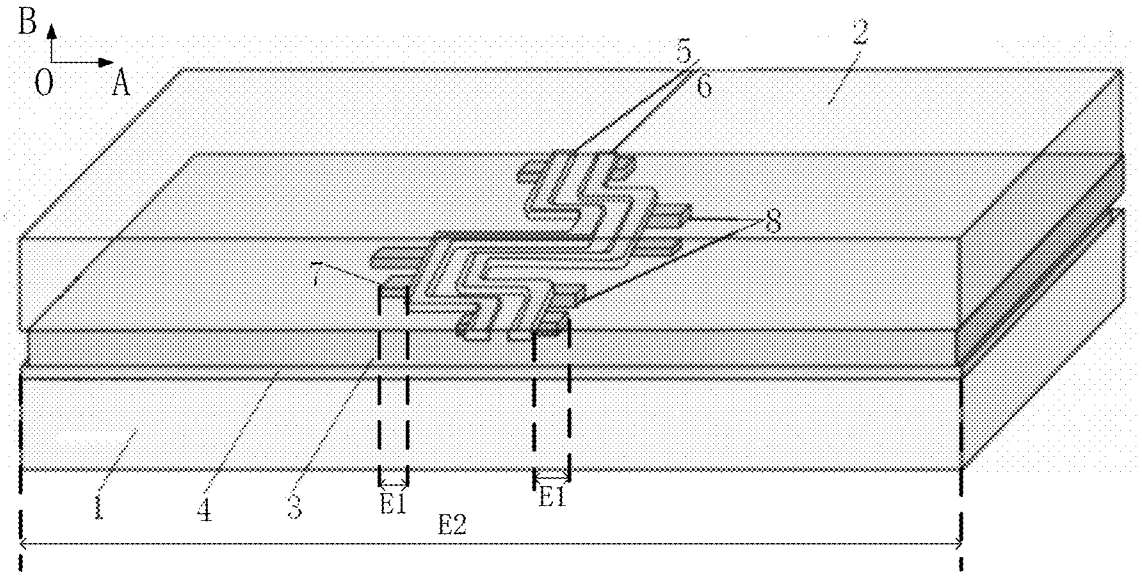
FIG. 1 is a schematic structural diagram of a tunable phase shifter according to an embodiment of the present application.

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the drawings, in order for clarity, the thicknesses of the regions and the layers might be exaggerated. In the drawings, the same reference numbers represent the same or similar components, and therefore the detailed description on them are omitted. Moreover, the drawings are merely schematic illustrations of the present application, and are not necessarily drawn to scale.

In the embodiments of the present application, unless stated otherwise, the meaning of "plurality of" is "two or more". The terms that indicate orientation or position relations, such as "upper", are based on the orientation or position relations shown in the drawings, and are merely for conveniently describing the present application and simplifying the description, rather than indicating or implying that the component or element must have the specific orientation and be constructed and operated according to the specific orientation. Therefore, they should not be construed as a limitation on the present application.

Unless stated otherwise in the context, throughout the description and the claims, the term "comprise" is interpreted as the meaning of opened containing, i.e., "including but not limited to". In the description of the present disclosure, the terms "one embodiment", "some embodiments", "exemplary embodiments", "example", "specific example" or "some examples" are intended to indicate that specific features, structures, materials or characteristics related to the embodiment or example are included in at least one embodiment or example of the present application. The illustrative indication of the above terms does not necessarily refer to the same one embodiment or example. Moreover, the specific features, structures, materials or characteristics may be included in any one or more embodiments or examples in any suitable manner.

In the embodiments of the present application, terms such as "first", "second", "third", "fourth", "fifth" and "sixth" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features.

The rapid social development comes with the quick increase of information flow. Antennas are indispensable for the communications of the modern society, and phase shifters, as the core component of the feed network, decide the performances of antennas to a large extent. The main function of the phase shifters applied in the field of microwave communication is changing the phase of the microwave signal, which requires the phase shifters to have characteristics such as a low insertion loss, a low reflection, a high phase-shift amount and a low volume.

The commonly used phase shifters have mainly three types, wherein the first type is the phase shifters based on the CPW structure, the second type is the MEMS phase shifters based on the MEMS process, and the third type is the phase shifters based on the microstrip line structure. The phase shifters based on the CPW structure have disadvantages such as a high loss. Although the MEMS phase shifters based on the MEMS process have the advantage that they can be fabricated into low-loss phase shifters and the insertion loss of the phase shifters is reduced, the currently used MEMS phase shifters have disadvantages such as mechanical fatigue and a short switch life after long-time usage, and as a result the application of the MEMS phase shifters is challenged. The phase shifters based on the microstrip line structure are the mostly commonly used, and have advantages such as a simple structure and easy processing.

However, the currently commonly used phase shifters based on the microstrip line structure have disadvantages such as that the phase-shift amount is low and the peripheral space structure cannot be sufficiently utilized to realize high-efficiency integration, which affects the performances of the antennas using the phase shifters based on the microstrip line structure.

Figure 2:
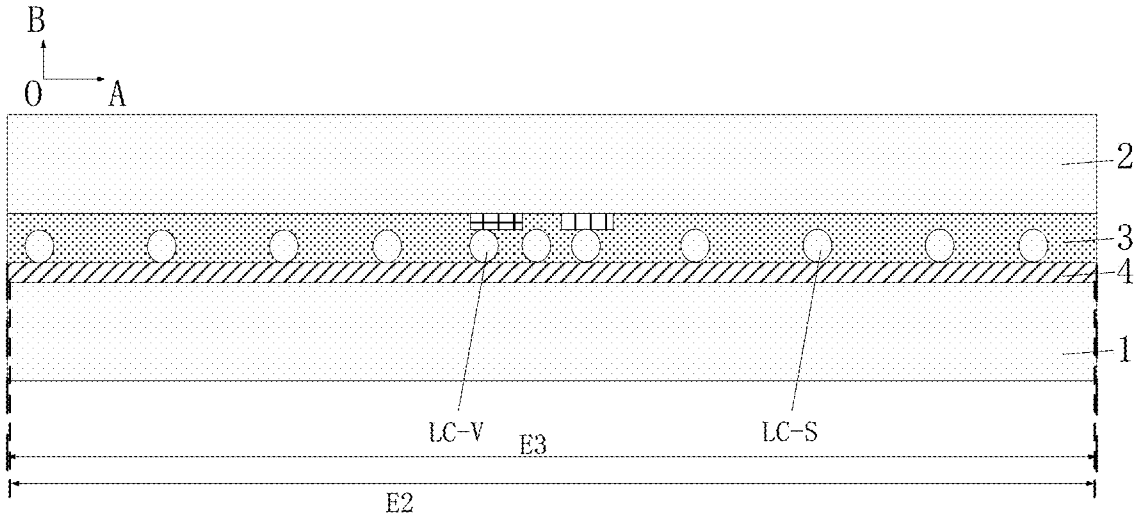
FIG. 2 is a schematic structural diagram of another tunable phase shifter according to an embodiment of the present application.

In view of the above, an embodiment of the present application provides a tunable phase shifter. Referring to FIG. 1 and FIG. 2, the tunable phase shifter includes:

- a first substrate 1 and a second substrate 2, wherein the first substrate 1 and the second substrate 2 face each other;
- a regulatable dielectric layer 3 provided between the first substrate 1 and the second substrate 2;
- a first electrode layer provided between the first substrate 1 and the regulatable dielectric layer 3, wherein the first electrode layer includes a reference electrode 4; and
- a second electrode layer provided between the second substrate 2 and the regulatable dielectric layer 3, wherein the second electrode layer includes a first transmission line 5 and a second transmission line 6, the first transmission line 5 is provided with a first branch 7, the second transmission line 6 is provided with a second branch 8, and the orthographic projections E1 on the first substrate 1 of the first branch 7 and the second branch 8 and the orthographic projection E2 of the reference electrode 4 on the first substrate 1 at least partially overlap.

The first substrate and the second substrate face each other. The structure of the first substrate is not particularly limited herein. As an example, as shown in FIG. 1 and FIG. 2, the reference electrode 4 is used as the first electrode layer, and is directly provided on the first substrate 1. Alternatively, the first substrate may include a first substrate and a first electrode layer provided on the side of the first substrate that is close to the regulatable dielectric layer. Certainly, the first substrate may further include other film layers than the first substrate and the first electrode layer, which is determined particularly according to the practical application scenes, functions and so on of the tunable phase shifter.

As an example, as shown in FIG. 1 and FIG. 2, the first transmission line 5 and the second transmission line 6 may be directly provided on the second substrate 2. Alternatively, the second substrate may include a second substrate and a first transmission line and a second transmission line that are provided on the side of the second substrate that is close to the regulatable dielectric layer. Certainly, the second substrate may further include other film layers than the second substrate, the first transmission line and the second transmission line, which is determined particularly according to the practical application scenes, functions and so on of the tunable phase shifter.

The materials and the thicknesses of the first substrate and the second substrate are not particularly limited herein. The materials and the thicknesses of the first substrate and the second substrate may be both the same, and, certainly, may also be both different, which is determined particularly according to practical applications. As an example, the first substrate and the second substrate have the same material and equal thicknesses. Alternatively, the first substrate and the second substrate have different materials and unequal thicknesses. Alternatively, the first substrate and the second substrate have the same material and unequal thicknesses. Alternatively, the first substrate and the second substrate have the different material and equal thicknesses. If the materials of the first substrate and the second substrate are the same, both of the materials of the first substrate and the second substrate may, for example, be glass, epoxy resin and so on. If both of the materials of the first substrate and the second substrate are glass, the glass may be a transparent glass, or the glass may be a non-transparent glass. In order to enable the tunable phase shifter to better match with the electric circuits and so on based on a glass substrate, preferably, both of the materials of the first substrate and the second substrate are a transparent glass. If the thicknesses of the first substrate and the second substrate are equal, both of the ranges of the thicknesses of the first substrate and the second substrate in the direction perpendicular to the regulatable dielectric layer may be 100 μm-10 mm. Particularly, both of the thicknesses of the first substrate and the second substrate in the direction perpendicular to the regulatable dielectric layer may be 100 μm, 300 μm, 500 μm, 1 mm, 3 mm, 5 mm, 7 mm, 10 mm and so on.

The regulatable dielectric layer may include a dielectric. The dielectric constant of the dielectric may change by the effect of different electric fields, whereby the tunable phase shifter has the function of phase shifting. The range of the dielectric constant of the dielectric is not particularly limited herein. As an example, the range of the dielectric constant of the dielectric may be greater than or equal to 1. The dielectric is not particularly limited herein. As an example, the dielectric may be a liquid crystal. If the dielectric is a liquid crystal, the dielectric constant of the liquid crystal is greater than 1, and the particular dielectric constant of the liquid crystal may be determined according to the material of the liquid crystal, the working wave band of the tunable phase shifter and so on in practical processes. FIG. 2 illustrates by taking the case as an example in which the dielectric is a liquid crystal, where the liquid crystal located between the first transmission line, the second transmission line and the reference electrode 4 is marked as LC-V, and the liquid crystal located between the second substrate 2 and the reference electrode 4 is marked as LC-S.

The particular structure and height of the regulatable dielectric layer are not particularly limited herein. As an example, the regulatable dielectric layer may include merely a dielectric. Alternatively, the regulatable dielectric layer may include a dielectric and a supporting component, and the supporting component surrounds the dielectric in a circle. The shape and the type of the supporting unit are not particularly limited herein. As an example, the shape of the supporting unit may be rectangular. As an example, the supporting unit may include a frame sealing adhesive. It should be noted that the supporting component may also be a non-circular shape, but is provided 10 on at least one side of the regulatable dielectric layer, to support the first substrate and the second substrate; for example, the supporting component may be one or more cushions. As an example, the range of the height of the regulatable dielectric layer in the direction perpendicular to the first substrate is 1-151 μm. Particularly, the height of the regulatable dielectric layer in the direction perpendicular to the first substrate may be 1 μm, 4 μm, 8 μm, 10 μm, 15 μm and so on. The height of the regulatable dielectric layer in the direction perpendicular to the first substrate is less than $\lambda/1000$, where $\lambda$ refers to the corresponding wavelength when the tunable phase shifter is operating at the center frequency point f0.

That the second electrode layer includes the first transmission line and the second transmission line refers to that the second electrode layer includes merely the first transmission line and the second transmission line, or the second electrode layer includes the first transmission line and the second transmission line, and other components than the first transmission line and the second transmission line, which is determined particularly according to the practical application scenes, functions and so on of the tunable phase shifter.

The types, the shapes, the materials and the fabricating processes of the first transmission line and the second transmission line are not particularly limited herein. As an example, the first transmission line and the second transmission line may include a microstrip line. Particularly, the first transmission line and the second transmission line may be coupled microstrip lines. As an example, the shapes of the first transmission line and the second transmission line may be completely the same. Alternatively, the shapes of the first transmission line and the second transmission line may be completely different. Alternatively, the shapes of the first transmission line and the second transmission line may be partially the same. If the first transmission line and the second transmission line are coupled microstrip lines, both of the shapes of the first transmission line and the second transmission line may be a straight line, or both of the shapes of the first transmission line and the second transmission line may be a line having a turning element shown in FIG. 1. In order to enable the tunable phase shifter to have a better function of phase shifting, preferably, both of the first transmission line and the second transmission line have a turning element, whereby the parameters of the first transmission line and the second transmission line having the turning element can be changed, to realize the impedance matching with the reference electrode. As an example, both of the materials of the first transmission line and the second transmission line may include a low-resistance low-loss metal, for example, copper, gold and silver. As an example, both of the first transmission line and the second transmission line may be fabricated by using processes such as magnetron sputtering, thermal evaporation and electroplating.

One end of both of the first transmission line and the second transmission line is configured to input a signal, and the other end is configured to output a signal. The types of the signals are not particularly limited herein. As an example, the signals may include a non-balanced signal. Alternatively, the signals may include a balanced signal, for example, a differential signal.

That the first electrode layer includes the reference electrode refers to that the first electrode layer includes merely the reference electrode, in which case the first electrode layer May be used as the reference electrode, or the first electrode layer includes the reference electrode, and other components than the reference electrode, which is determined particularly according to the practical application scenes, functions and so on of the tunable phase shifter.

The material, the shape, the fabricating process, the structure and the height of the reference electrode are not particularly limited herein. As an example, the material of the reference electrode may include a low-resistance low-loss metal, for example, copper, gold and silver. As an example, the reference electrode may be fabricated by using processes such as magnetron sputtering, thermal evaporation and electroplating. As an example, the shape of the orthographic projection of the reference electrode on the first substrate may be rectangular, as shown in FIG. 1, and, certainly, may also be another shape, which is determined particularly according to practical applications. As an example, the reference electrode may be provided at the whole surface of the side of the first substrate that is close to the regulatable dielectric layer. Alternatively, referring to FIG. 6, the reference electrode may include penetrating grooves 9. As an example, the range of the height of the reference electrode in the direction perpendicular to the first substrate is 0.2-5 μm. Particularly, the height of the reference electrode in the direction perpendicular to the first substrate may be 0.2 μm, 1 μm, 2 μm, 3 μm, 5 μm and so on. The height of the reference electrode in the direction perpendicular to the first substrate is less than λ/1000, where λ refers to the corresponding wavelength when the tunable phase shifter is operating at the center frequency point f0.

The first transmission line is provided with a first branch, and the second transmission line is provided with a second branch. The quantities, the shapes and the distribution modes of the first branch and the second branch are not particularly limited herein. As an example, the shapes of the orthographic projections of the first branch and the second branch on the first substrate may be rectangular, as shown in FIG. 5 and FIG. 7 to FIG. 10, and may also be another shape, for example, a triangle, an ellipse and a trapezoid. As an example, the quantities of the first branch and the second branch may be at least one. Given that it is required to form an electric field between the first branch and the second branch and the reference electrode to enable the tunable phase shifter to have the function of phase shifting, both of the quantities of the first branch and the second branch are set to be more than one. As an example, the first branches may be distributed in the first transmission line equidistantly, and the second branches may be distributed in the second transmission line equidistantly. Alternatively, the first branches may be distributed in the first transmission line non-equidistantly, and the second branches may be distributed in the second transmission line non-equidistantly. Alternatively, the first branches may be distributed in the first transmission line equidistantly, and the second branches may be distributed in the second transmission line non-equidistantly. Alternatively, the first branches may be distributed in the first transmission line non-equidistantly, and the second branches may be distributed in the second transmission line equidistantly.

That the orthographic projections on the first substrate of the first branch and the second branch and the orthographic projection of the reference electrode on the first substrate at least partially overlap refers to that the orthographic projections on the first substrate of the first branch and the second branch and the orthographic projection of the reference electrode on the first substrate partially overlap, or the orthographic projections on the first substrate of the first branch and the second branch and the orthographic projection of the reference electrode on the first substrate completely overlap.

The tunable phase shifter according to the embodiments of the present application includes: a first substrate and a second substrate, and the first substrate and the second substrate face each other; a regulatable dielectric layer provided between the first substrate and the second substrate; a first electrode layer provided between the first substrate and the regulatable dielectric layer, and the first electrode layer includes a reference electrode; and a second electrode layer provided between the second substrate and the regulatable dielectric layer, and the second electrode layer includes a first transmission line and a second transmission line, one end of both of the first transmission line and the second transmission line is configured to input a signal, the other end is configured to output a signal, the first transmission line is provided with a first branch, the second transmission line is provided with a second branch, and the orthographic projections on the first substrate of the first branch and the second branch and the orthographic projection of the reference electrode on the first substrate at least partially overlap. Accordingly, in the tunable phase shifter according to the embodiments of the present application, the first branches can be loaded on every position of the first transmission line, and the second branches can be loaded on every position of the second transmission line. Accordingly, the tunable phase shifter can form an intersection or overlapping electric field between the first branches and the second branches and the reference electrode, which electric field can drive the dielectric in the regulatable dielectric layer, for example, a liquid crystal, to deflect, thereby, by using the intersection or overlapping electric field, applying a voltage and changing the effective dielectric constant $\varepsilon_r$ of the dielectric in the regulatable dielectric layer between the first branches and the second branches and the reference electrode, which can change the capacitance value of the formed plate capacitor, to realize the function of phase shifting.

Figure 3:
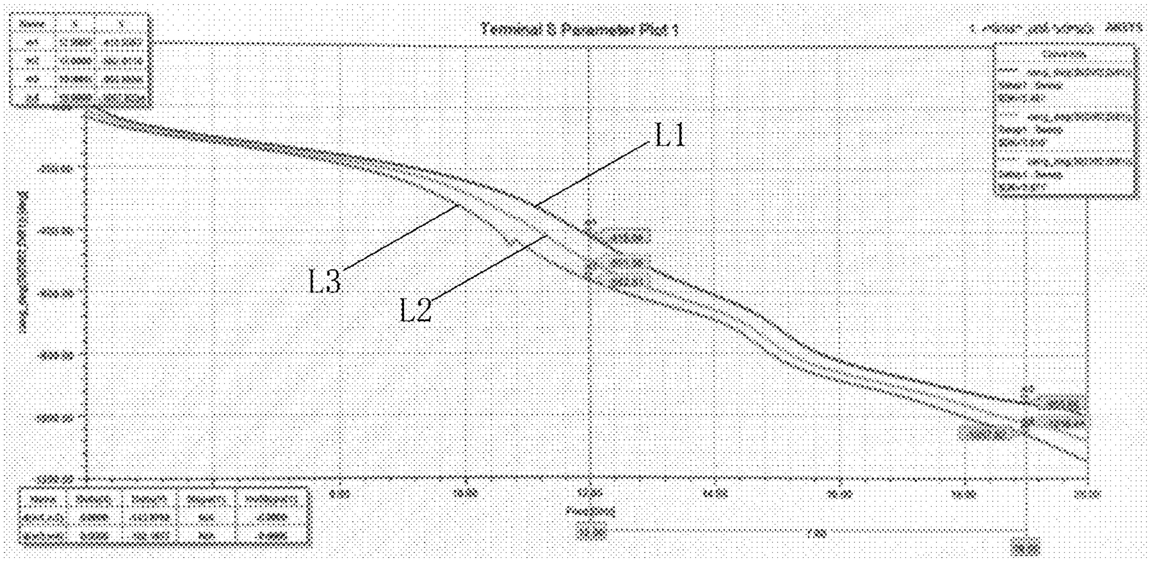
FIG. 3 is a diagram of the relation between the frequency and the phase of a tunable phase shifter according to an embodiment of the present application.

By simulated verification of the tunable phase shifter according to the embodiments of the present application, the emulation result of the tunable phase shifter is obtained as shown in FIG. 3, in which case the height of the regulatable dielectric layer of the tunable phase shifter in the direction perpendicular to the first substrate is 2 μm, the height of the reference electrode in the direction perpendicular to the first substrate is 0.2 μm (both of the height of the regulatable dielectric layer in the direction perpendicular to the first substrate and the height of the reference electrode in the direction perpendicular to the first substrate are less than λ/1000, where λ refers to the corresponding wavelength when the tunable phase shifter is operating at the center frequency point f0), and the dielectric constant of the liquid crystal ranges 2.461-3.571. FIG. 3 is a schematic diagram of curves of the working frequency and the phase at the outputting ports of the first branch and the second branch of the tunable phase shifter, where the horizontal coordinate represents the frequency with the unit of GHz, and the vertical coordinate represents the phase with the unit of °. Referring to FIG. 3, in the curve L1 the phase at the frequency of 12 GHz is −418.04°, and in the curve L1 the phase at the frequency of 19 GHz is −955.66°. In the curve L2 the phase at the frequency of 12 GHz is −501.58°, and in the curve L2 the phase at the frequency of 19 GHz is −1018.44°. In the curve L3 the phase at the frequency of 12 GHz is −562.01°, and in the curve L3 the phase at the frequency of 19 GHz is −1057.82°. Therefore, within the frequency band of 0-20 GHz, the tunable phase shifter, when operating at the center frequency point f0, can realize a phase shift greater than 140°; in other words, it has an excellent function of phase shifting.

Optionally, referring to FIG. 1 and FIG. 2, the first electrode layer is used as the reference electrode 4, and the orthographic projection E2 of the reference electrode 4 on the first substrate 1 and the orthographic projection E3 of the regulatable dielectric layer 3 on the first substrate 1 at least partially overlap. Accordingly, the electric field formed between the first transmission line and the second transmission line and the reference electrode can control the dielectric in the regulatable dielectric layer, for example, a liquid crystal, to deflect, whereby the tunable phase shifter has the function of phase shifting.

That the orthographic projection of the reference electrode on the first substrate and the orthographic projection of the regulatable dielectric layer on the first substrate at least partially overlap refers to that, referring to FIG. 1 and FIG. 2, the orthographic projection E2 of the reference electrode 4 on the first substrate 1 and the orthographic projection E3 of the regulatable dielectric layer 3 on the first substrate 1 completely overlap. Alternatively, the orthographic projection of the reference electrode on the first substrate and the orthographic projection of the regulatable dielectric layer on the first substrate partially overlap, which may include various cases. For example, if the reference electrode is provided at the whole surface, at least part of the outer contour of the orthographic projection of the regulatable dielectric layer on the first substrate is located within the orthographic projection of the reference electrode on the first substrate. Alternatively, if the reference electrode is provided at the whole surface, at least part of the outer contour of the orthographic projection of the reference electrode on the first substrate is located within the orthographic projection of the regulatable dielectric layer on the first substrate. Alternatively, if the reference electrode has penetrating grooves, at least part of the outer contour of the orthographic projection of the regulatable dielectric layer on the first substrate is located within the orthographic projection of the reference electrode on the first substrate. Alternatively, if the reference electrode has penetrating grooves, the outer contour of the orthographic projection of the regulatable dielectric layer on the first substrate and the outer contour of the orthographic projection of the reference electrode on the first substrate coincide, and so on.

Optionally, the reference electrode is provided at a whole surface. Accordingly, the reference electrode is easily fabricated, to be simply and easily implemented.

Figure 6:
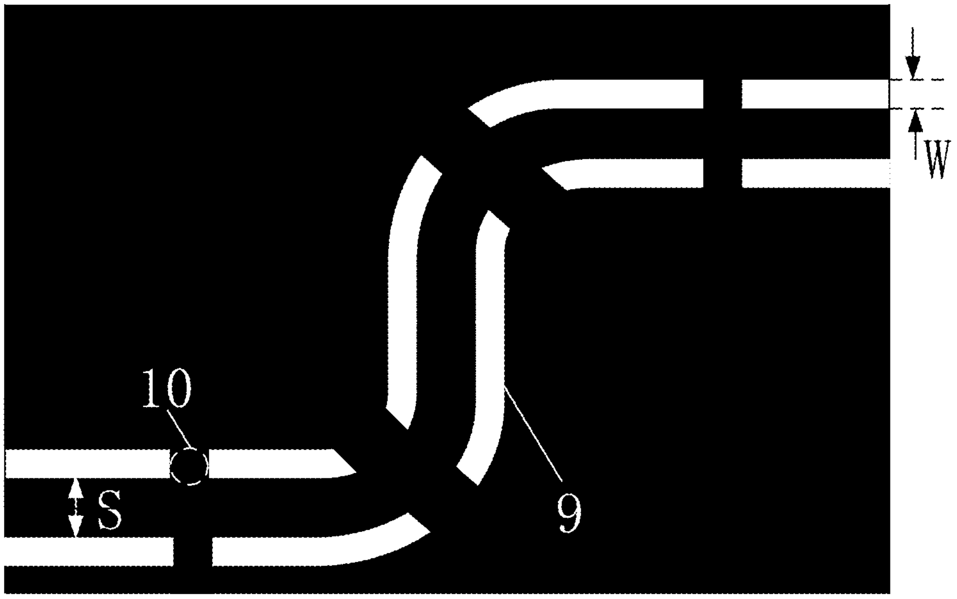
FIG. 6 is a schematic structural diagram of a reference electrode according to an embodiment of the present application.

Optionally, referring to FIG. 6, the reference electrode 4 has a plurality of penetrating grooves 9, and the outer contour of the orthographic projection of the first transmission line on the first substrate and the outer contour of the orthographic projection of the second transmission line on the first substrate at least partially coincide with the regions encircled by the orthographic projections of the outer contours of the grooves 9 on the first substrate. Accordingly, the phase-shift amount of the tunable phase shifter can be effectively increased.

The reference electrode has a plurality of penetrating grooves. The structure of the plurality of penetrating grooves is not particularly limited herein. As an example, all of the penetrating grooves are communicated. Alternatively, some of the penetrating grooves are communicated. Alternatively, none of the grooves are communicated, and, as shown in FIG. 6, each of the grooves 9 is independent.

The shape of the grooves is not particularly limited herein. As an example, the shape of the grooves may match with the shape of the whole first transmission line and the whole second transmission line. Alternatively, the shape of the grooves may match with the shape of part of the first transmission line and part of the second transmission line. FIG. 6 illustrates by taking the case as an example in which the shape of some of the grooves 9 matches with the part of the first transmission line other than the first branch and the shape of the other grooves 9 matches with the part of the second transmission line other than the second branch.

That the outer contour of the orthographic projection of the first transmission line on the first substrate and the outer contour of the orthographic projection of the second transmission line on the first substrate at least partially coincide with the regions encircled by the orthographic projections of the outer contours of the grooves on the first substrate refers to that the outer contour of the orthographic projection of the first transmission line on the first substrate and the outer contour of the orthographic projection of the second transmission line on the first substrate partially coincide with the regions encircled by the orthographic projections of the outer contours of the grooves on the first substrate, or the outer contour of the orthographic projection of the first transmission line on the first substrate and the outer contour of the orthographic projection of the second transmission line on the first substrate completely coincide with the regions encircled by the orthographic projections of the outer contours of the grooves on the first substrate. FIG. 6 illustrates by taking the case as an example in which the outer contour of the orthographic projection of the first transmission line on the first substrate and the outer contour of the orthographic projection of the second transmission line on the first substrate partially coincide with the regions encircled by the orthographic projections of the outer contours of the grooves 9 on the first substrate. In this case, the effect of phase shifting of the tunable phase shifter after the emulation is good.

Optionally, at least some of the grooves are communicated. Accordingly, the phase-shift amount of the tunable phase shifter can be effectively increased.

That at least some of the grooves are communicated refers to that some of the grooves are communicated, or all of the grooves are communicated. If some of the grooves are communicated, the quantities and the shapes of the communicated grooves are not particularly limited herein, and are determined particularly according to practical applications.

Optionally, referring to FIG. 6, each two neighboring grooves 9 are separated, two neighboring grooves 9 share one supporting part 10, and part of the area of the supporting part 10 serves as the side walls of the grooves. Accordingly, grooves are provided at the non-branch parts of the orthographic projections of the first transmission line and the second transmission line, to separate the branches connected to the first transmission line and the second transmission line from the region corresponding to the reference electrode, thereby forming the plate capacitor. By controlling the effective dielectric constant of the dielectric, for example, the liquid crystal LC-V, in the particular region between the branches and the reference electrode by using the voltage between the branches and the reference electrode, the loaded capacitance value is changed, to change the phase-shift amount of the tunable phase shifter.

The size and the shape of the supporting part are not particularly limited herein. As an example, the orthographic projection of the supporting part on the first substrate may completely overlap with the orthographic projection on the first substrate of the part of the first branch that is connected to the first transmission line and the orthographic projection on the first substrate of the part of the second branch that is connected to the second transmission line. Alternatively, the orthographic projection of the supporting part on the first substrate may be located within the orthographic projection on the first substrate of the part of the first branch that is connected to the first transmission line and the orthographic projection on the first substrate of the part of the second branch that is connected to the second transmission line. Alternatively, the orthographic projection on the first substrate of the part of the first branch that is connected to the first transmission line and the orthographic projection on the first substrate of the part of the second branch that is connected to the second transmission line may be located within the orthographic projection of the supporting part on the first substrate. As an example, the shape of the orthographic projection of the supporting part 10 on the first substrate may be rectangular, as shown in FIG. 6, and, certainly, may also be another shape, which may be determined particularly according to the shapes of the first branch and the second branch.

FIG. 6 illustrates by taking the case as an example in which the outer contour of the orthographic projection of the first transmission line on the first substrate and the outer contour of the orthographic projection of the second transmission line on the first substrate partially coincide with the regions encircled by the orthographic projections of the outer contours of the grooves 9 on the first substrate, and the orthographic projection of the supporting part 10 on the first substrate completely intersects or overlaps with the orthographic projection on the first substrate of the part of the first branch that is connected to the first transmission line and the orthographic projection on the first substrate of the part of the second branch that is connected to the second transmission line. In this case, the positions and the shapes of the grooves may be configured according to the first transmission line, the first branch, the second transmission line and the second branch, to be simply and easily implemented.

Optionally, the orthographic projection on the first substrate of the part of the first branch that is connected to the first transmission line and the orthographic projection on the first substrate of the part of the second branch that is connected to the second transmission line at least partially overlap with the orthographic projection of the supporting part on the first substrate. Accordingly, the phase-shift amount of the tunable phase shifter can be effectively increased.

That the orthographic projection on the first substrate of the part of the first branch that is connected to the first transmission line and the orthographic projection on the first substrate of the part of the second branch that is connected to the second transmission line at least partially overlap with the orthographic projection of the supporting part on the first substrate refers to that the orthographic projection on the first substrate of the part of the first branch that is connected to the first transmission line and the orthographic projection on the first substrate of the part of the second branch that is connected to the second transmission line partially overlap with the orthographic projection of the supporting part on the first substrate, or the orthographic projection on the first substrate of the part of the first branch that is connected to the first transmission line and the orthographic projection on the first substrate of the part of the second branch that is connected to the second transmission line completely overlap with the orthographic projection of the supporting part on the first substrate.

Optionally, referring to FIG. 6, both of the outer contour of the orthographic projection on the first substrate of the part of the first branch that is connected to the first transmission line and the outer contour of the orthographic projection on the first substrate of the part of the second branch that is connected to the second transmission line coincide with the outer contour of the orthographic projection of the supporting part 10 on the first substrate. That, on the basis that the phase-shift amount of the tunable phase shifter can be effectively increased, can be simply and easily implemented.

Optionally, referring to FIG. 1 and FIG. 2, both of the outer contours of the orthographic projections E1 on the first substrate 1 of the first branch 7 and the second branch 8 coincide with the outer contour of the orthographic projection E2 of the reference electrode 4 on the first substrate 1. That can ensure that the first branch and the second branch overlap with the reference electrode to the largest extent, effectively increases the phase-shift amount of the tunable phase shifter, and can be simply and easily implemented.

Optionally, referring to FIG. 4 to FIG. 5 and FIG. 7 to FIG. 10, the direction of extension of the first transmission line 5 and the direction of extension of the second transmission line 6 are the same.

Figure 4:
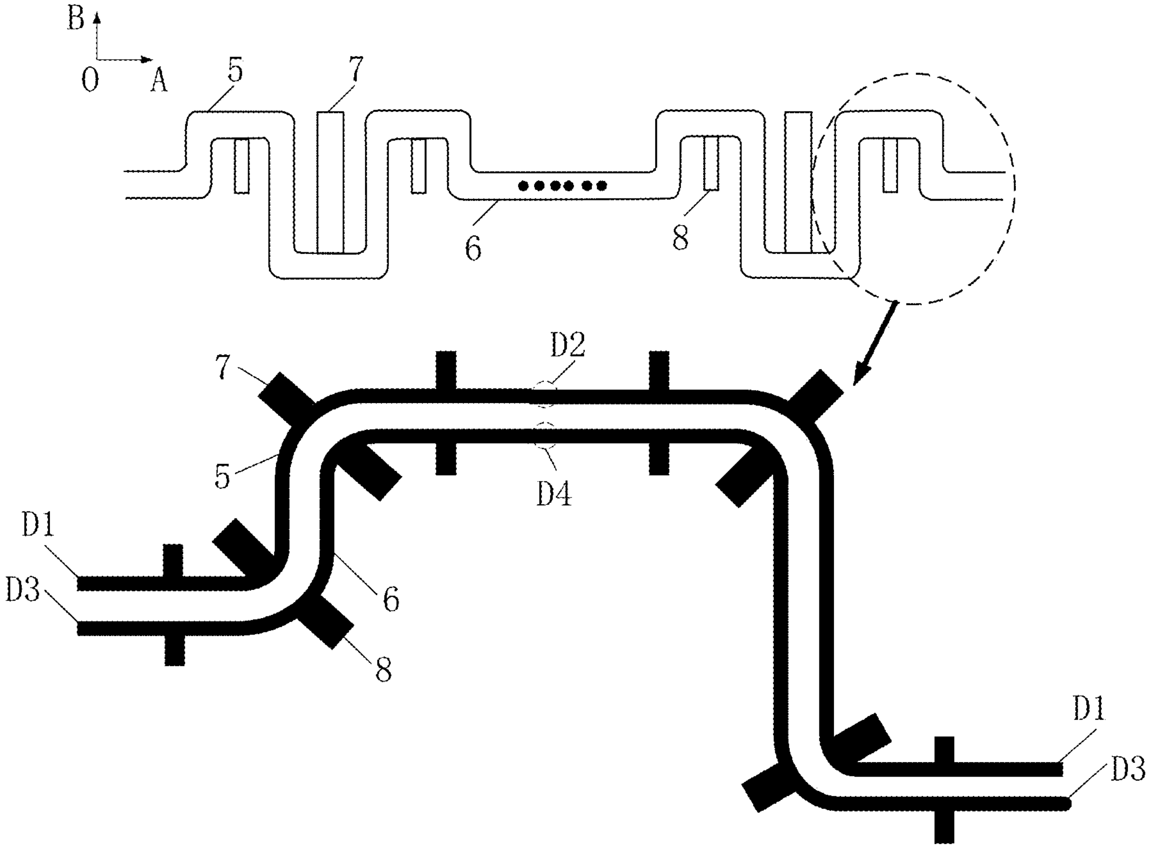
FIG. 4 is a schematic structural diagram of a first sub-transmission-line group and a second sub-transmission-line group according to an embodiment of the present application.

Referring to FIG. 4, the first transmission line 5 includes at least one first sub-transmission-line group, and the second transmission line 6 includes at least one second sub-transmission-line group. Accordingly, when a signal is fed into one end of the first transmission line and the second transmission line, the first transmission line and the second transmission line can couple the signal, and transmit the signal.

The quantities and the shapes of the transmission lines included by the first sub-transmission-line group and the second sub-transmission-line group are not particularly limited herein. FIG. 4 illustrates by taking the case as an example in which the first transmission line 5 and the second transmission line 6 are coupled transmission lines. In this case, the quantity of the first sub-transmission lines included by the first sub-transmission-line group and the quantity of the second sub-transmission lines included by the second sub-transmission-line group are equal, and the shape of the first sub-transmission lines included by the first sub-transmission-line group and the shape of the second sub-transmission lines included by the second sub-transmission-line group match.

Optionally, referring to FIG. 4, the first sub-transmission-line group includes two first sub-transmission lines, each of the first sub-transmission lines includes a first end D1 and a second end D2, and the second end D2 of one of the first sub-transmission lines and the second end D2 of the other of the first sub-transmission lines are directly connected.

Referring to FIG. 4, the second sub-transmission-line group includes two second sub-transmission lines, each of the second sub-transmission lines includes a third end D3 and a fourth end D4, and the fourth end D4 of one of the second sub-transmission lines and the fourth end D4 of the other of the second sub-transmission lines are directly connected. The same ends of two transmission lines of the sub-transmission-line groups can be connected together, thereby forming the coupled transmission lines.

The shapes, the lengths and the widths of the two first sub-transmission lines included by the first sub-transmission-line group are not particularly limited herein. As an example, the two first sub-transmission lines may be completely the same, so that the two first sub-transmission lines are provided symmetrically with respect to the second end. Alternatively, at least one of the lengths in the first direction (the direction OA shown in FIG. 4) of the two first sub-transmission lines and the widths in the second direction (the direction OB shown in FIG. 4) of the two first sub-transmission lines is unequal. For example, the lengths in the direction OA of the two first sub-transmission lines are equal, and the widths in the direction OB of the two first sub-transmission lines are unequal. Alternatively, the lengths in the direction OA of the two first sub-transmission lines are unequal, and the widths in the direction OB of the two first sub-transmission lines are equal. Alternatively, the lengths L in the direction OA of the two first sub-transmission lines are unequal, and the widths in the direction OB of the two first sub-transmission lines are unequal. The configurations of the two second sub-transmission lines included by the second sub-transmission-line group are similar to those of the two first sub-transmission lines, and are not discussed further herein. FIG. 4 illustrates by taking the case as an example in which the lengths in the direction OA of the two first sub-transmission lines are equal, and the widths in the direction OB of the two first sub-transmission lines are unequal.

Figure 9:
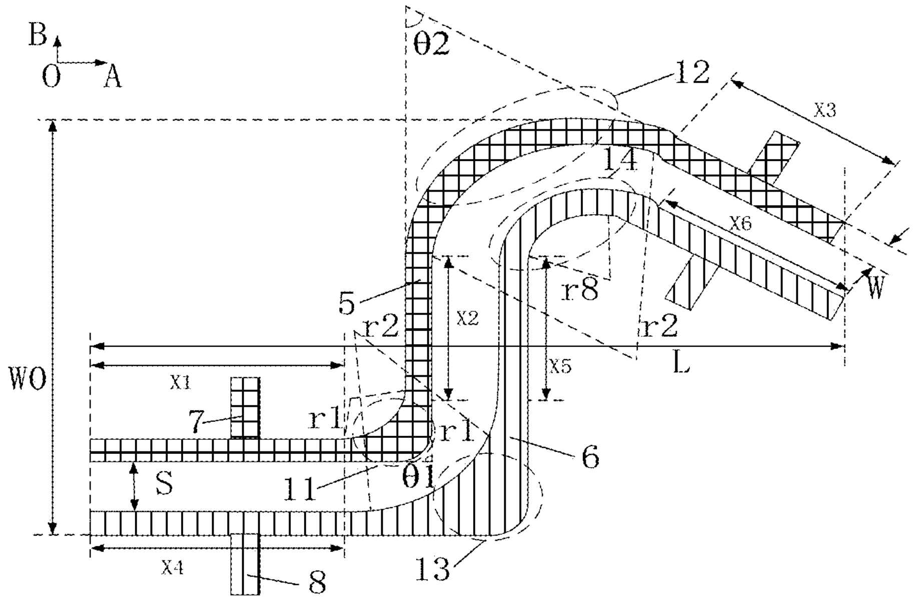
FIG. 9 is a schematic structural diagram of a fourth type of the first sub-transmission line and the second sub-transmission line according to an embodiment of the present application.

Optionally, referring to FIG. 9, each of the first sub-transmission lines includes a first line segment X1, a second line segment X2 and a third line segment X3, and the first line segment X1 is electrically connected to the third line segment X3 by the second line segment X2. The included angle θ1 between the direction of extension of the first line segment X1 and the direction of extension of the second line segment X2 is unequal to the included angle θ2 between the direction of extension of the third line segment X3 and the direction of extension of the second line segment X2. Each of the second sub-transmission lines includes a fourth line segment X4, a fifth line segment X5 and a sixth line segment X6, and the fourth line segment X4 is electrically connected to the sixth line segment X6 by the fifth line segment X5. The included angle between the direction of extension of the fourth line segment X4 and the direction of extension of the fifth line segment X5 is unequal to the included angle between the direction of extension of the sixth line segment X6 and the direction of extension of the fifth line segment X5. Accordingly, by using the second line segment, the first sub-transmission lines have a turning element, and by using the fifth line segment, the second sub-transmission lines have a turning element. Accordingly, by providing the turning elements of the unequal turning corners, a larger phase-shift amount can be generated at a particular frequency band, thereby changing the center frequency point f0 where the maximum phase-shift amount of the tunable phase shifter is located.

Figure 5:
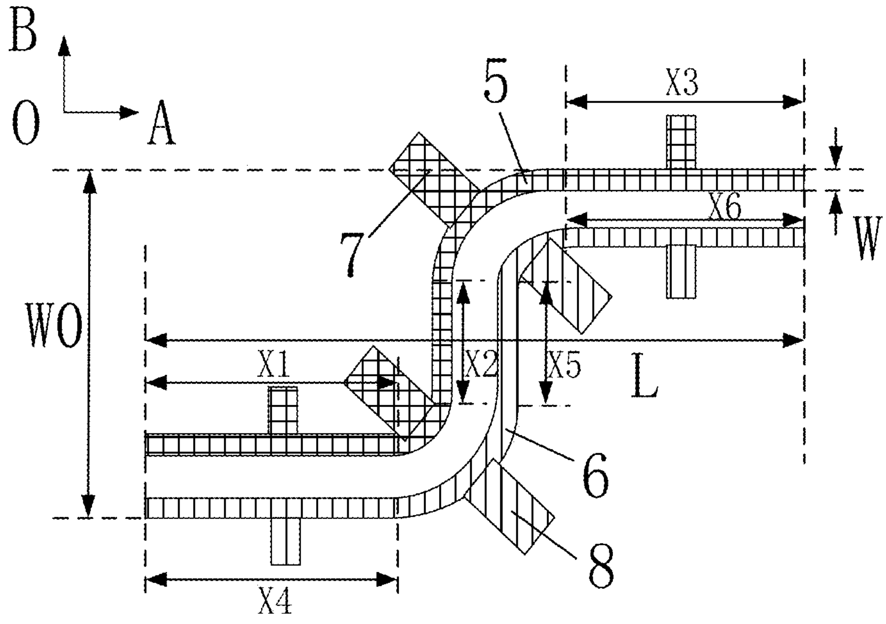
FIG. 5 is a schematic structural diagram of a first type of the first sub-transmission line and the second sub-transmission line according to an embodiment of the present application.
Figure 8:
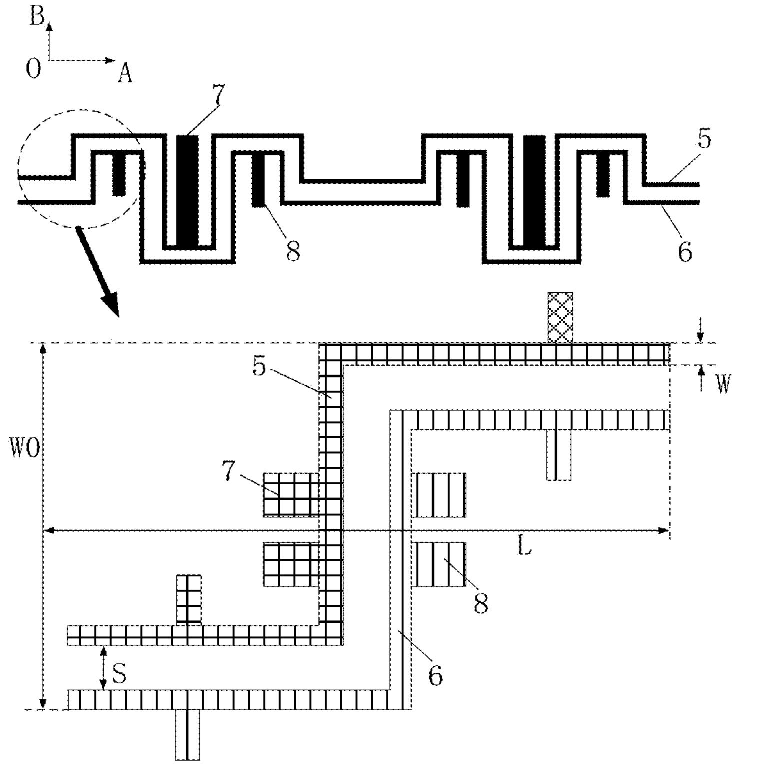
FIG. 8 is a schematic structural diagram of a third type of the first sub-transmission line and the second sub-transmission line according to an embodiment of the present application.

Each of the first sub-transmission lines includes a first line segment, a second line segment and a third line segment. The lengths and the line widths of the first line segment, the second line segment and the third line segment are not particularly limited herein. As an example, all of the lengths and the line widths of the first line segment, the second line segment and the third line segment may be equal. Alternatively, all of the lengths and the line widths of the first line segment, the second line segment and the third line segment may be unequal. Alternatively, the lengths and the line widths of the first line segment, the second line segment and the third line segment may be partially equal, which is determined particularly according to practical applications. As an example, both of FIG. 5 and FIG. 8 illustrate by taking the case as an example in which all of the lengths and the line widths of the first line segment, the second line segment and the third line segment may be equal. Accordingly, none of the first sub-transmission lines and the second sub-transmission lines is a straight line, which effectively increases the actual lengths in the first direction of the first sub-transmission lines and the second sub-transmission lines, and accordingly effectively increases the actual lengths in the first direction of the first transmission line and the second transmission line. Therefore, more first branches can be provided in the first transmission line having the higher length, and more second branches can be provided in the second transmission line, thereby effectively enlarging the electric field between the first branches and the second branches and the reference electrode, which increases the phase-shift amount, and can realize miniaturization of the tunable phase shifter.

The fourth line segment, the fifth line segment and the sixth line segment included by each of the second sub-transmission lines may have similar configurations to those of the first line segment, the second line segment and the third line segment, which is not discussed further herein.

It should be noted that, if the first transmission line and the second transmission line are coupled transmission lines, the first sub-transmission lines and the second sub-transmission lines may be completely the same. Alternatively, the first sub-transmission lines and the second sub-transmission lines may be partially the same, as long as it is ensured that the first sub-transmission lines can match with the second sub-transmission lines. Accordingly, the lengths and the line widths of the fourth line segment and the first line segment may be completely equal, and, certainly, may also be completely unequal, or partially equal. Likewise, the fifth line segment and the second line segment, and the sixth line segment and the third line segment, may be configured with reference to the fourth line segment and the first line segment, which is not discussed further herein. FIG. 9 illustrates by taking the case as an example in which all of the lengths and the line widths of the first line segment and the fourth line segment, the second line segment and the fifth line segment, and the third line segment and the sixth line segment are equal. Moreover, in FIG. 9 the minimum spacing between the first sub-transmission line and the second sub-transmission line is marked as S.

The particular mode in which the first line segment is electrically connected to the third line segment by the second line segment is not limited herein. As an example, the first line segment may be electrically connected to the second line segment by another component, and the first line segment may be electrically connected to the third line segment by another component. For example, as shown in FIG. 9, the first line segment X1 is connected to the second line segment X2 by a first turning corner 11, and the second line segment X2 is connected to the third line segment X3 by a second turning corner 12. Alternatively, the first line segment and the second line segment may directly contact, and the second line segment and the third line segment directly contact. The particular mode in which the fourth line segment is electrically connected to the sixth line segment by the fifth line segment is similar, and is not discussed further herein.

The included angle between the direction of extension of the first line segment and the direction of extension of the second line segment is unequal to the included angle between the direction of extension of the third line segment and the direction of extension of the second line segment. The magnitude relation between the included angle between the direction of extension of the first line segment and the direction of extension of the second line segment and the included angle between the direction of extension of the third line segment and the direction of extension of the second line segment is not particularly limited herein. As an example, as shown in FIG. 9, the included angle θ1 between the direction of extension of the first line segment X1 and the direction of extension of the second line segment X2 may be greater than the included angle θ2 between the direction of extension of the third line segment X3 and the direction of extension of the second line segment X2. In this case the included angle θ1 is a right angle, and the included angle θ2 is an acute angle. Certainly, the included angle θ1 may also be an obtuse angle, and the included angle θ2 is a right angle or acute angle. Alternatively, the included angle between the direction of extension of the first line segment and the direction of extension of the second line segment may also be smaller than the included angle between the direction of extension of the third line segment and the direction of extension of the second line segment.

It should be noted that the included angles are any angles greater than 0°, so that all of the first sub-transmission lines and the second sub-transmission lines are curved microstrip transmission lines, thereby the first transmission line and the second transmission line can be curved coupled microstrip transmission lines.

The direction of extension of the first line segment and the direction of extension of the second line segment are not particularly limited herein. As an example, as shown in FIG. 9, the direction of extension of the first line segment and the direction of extension of the second line segment may be different. Alternatively, the direction of extension of the first line segment and the direction of extension of the second line segment may be the same.

Both of the radians of the two different sides of any one of the turning corners are greater than 0°, thereby forming the turning element. For example, the radian of the side of the first turning corner 11 that is away from the second sub-transmission line is greater than 0°, and the radian of the side of the first turning corner 11 that is close to the second sub-transmission line is also greater than 0°.

Optionally, referring to FIG. 9, the included angle θ1 between the direction of extension of the first line segment X1 and the direction of extension of the second line segment X2 is greater than the included angle θ2 between the direction of extension of the third line segment X3 and the direction of extension of the second line segment X2. The included angle θ3 between the direction of extension of the fourth line segment X4 and the direction of extension of the fifth line segment X5 is greater than the included angle θ4 between the direction of extension of the sixth line segment X6 and the direction of extension of the fifth line segment X5. Accordingly, the third line segment and the sixth line segment can be further bent, to further realize miniaturization of the tunable phase shifter.

The magnitudes of the included angles are not particularly limited herein, and may be particularly determined according to the practical volume of the tunable phase shifter. FIG. 9 illustrates by taking the case as an example in which both of the included angle θ1 between the direction of extension of the first line segment X1 and the direction of extension of the second line segment X2 and the included angle between the direction of extension of the fourth line segment X4 and the direction of extension of the fifth line segment X5 are a right angle, and both of the included angle θ2 between the direction of extension of the third line segment X3 and the direction of extension of the second line segment X2 and the included angle between the direction of extension of the sixth line segment X6 and the direction of extension of the fifth line segment X5 are an acute angle.

Optionally, referring to FIG. 5, FIG. 7 to FIG. 8 and FIG. 10, each of the first sub-transmission lines includes a first line segment X1, a second line segment X2 and a third line segment X3, and the first line segment X1 is electrically connected to the third line segment X3 by the second line segment X2. The included angle θ1 between the direction of extension of the first line segment X1 and the direction of extension of the second line segment X2 is equal to the included angle θ2 between the direction of extension of the third line segment X3 and the direction of extension of the second line segment X2.

Each of the second sub-transmission lines includes a fourth line segment X4, a fifth line segment X5 and a sixth line segment X6, and the fourth line segment X4 is electrically connected to the sixth line segment X6 by the fifth line segment X5. The included angle θ3 between the direction of extension of the fourth line segment X4 and the direction of extension of the fifth line segment X5 is equal to the included angle θ4 between the direction of extension of the sixth line segment X6 and the direction of extension of the fifth line segment X5. Accordingly, the first sub-transmission lines and the second sub-transmission lines can be easily fabricated, to be simply and easily implemented.

Figure 7:
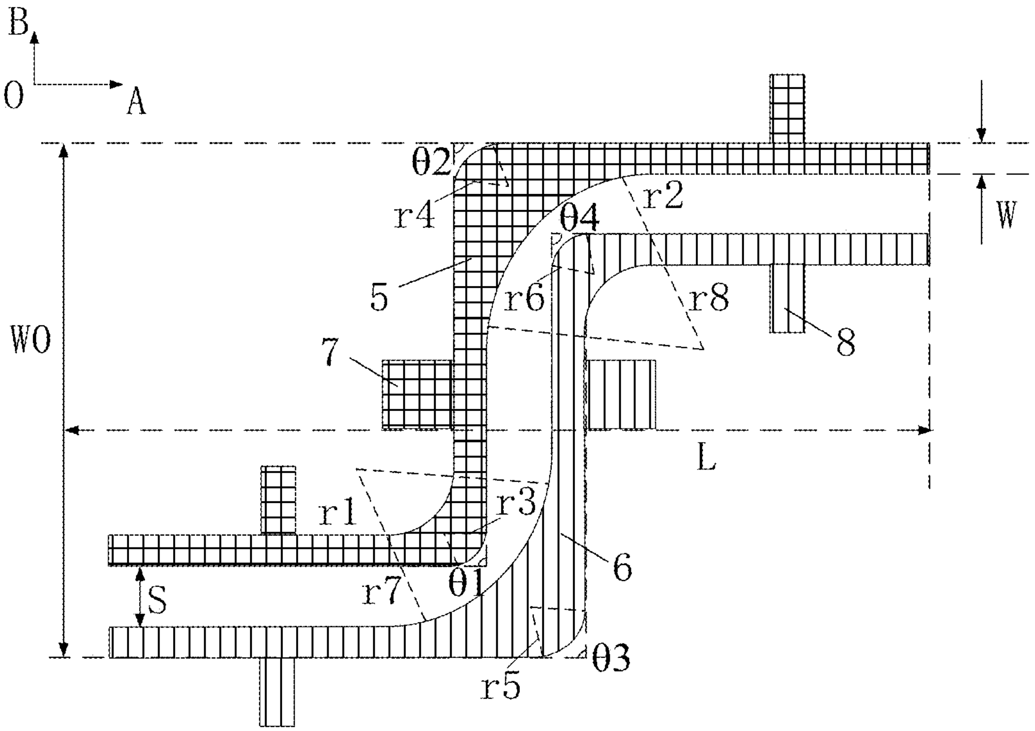
FIG. 7 is a schematic structural diagram of a second type of the first sub-transmission line and the second sub-transmission line according to an embodiment of the present application.
Figure 10:
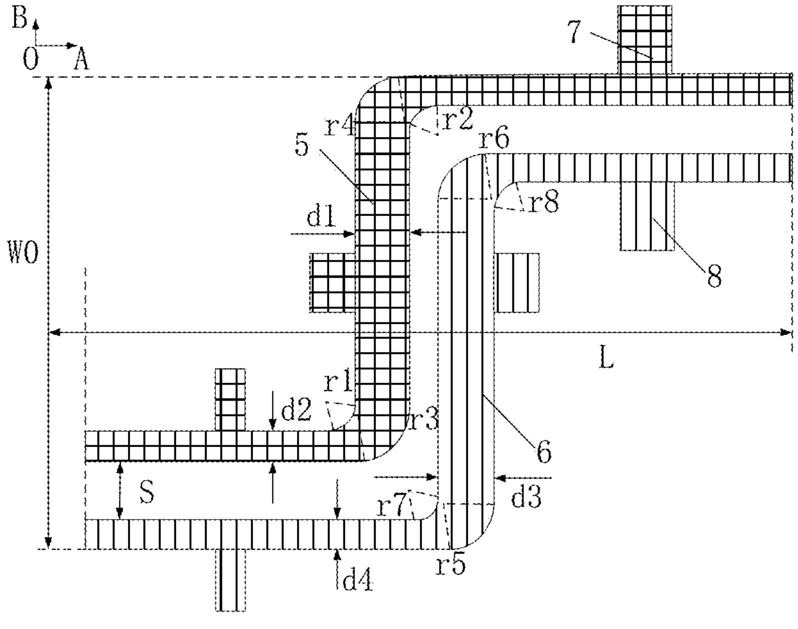
FIG. 10 is a schematic structural diagram of a fifth type of the first sub-transmission line and the second sub-transmission line according to an embodiment of the present application.

The particular mode in which the first line segment is electrically connected to the third line segment by the second line segment is not limited herein. As an example, the first line segment may be electrically connected to the second line segment by another component, and the first line segment may be electrically connected to the third line segment by another component. For example, as shown in FIG. 5, FIG. 7 and FIG. 10, the first line segment X1 is connected to the second line segment X2 by a first turning corner 11, and the second line segment X2 is connected to the third line segment X3 by a second turning corner 12. Alternatively, as shown in FIG. 8, the first line segment X1 and the second line segment X2 may directly contact, and the second line segment X2 and the third line segment X3 directly contact. The particular mode in which the fourth line segment is electrically connected to the sixth line segment by the fifth line segment is similar, and is not discussed further herein.

The included angles may be an acute angle, a right angle or an obtuse angle, which is not particularly limited herein. All of FIG. 5, FIG. 7 to FIG. 8 and FIG. 10 illustrate by taking the case as an example in which all of the included angle θ1, the included angle θ2, the included angle θ3 and the included angle θ4 are a right angle.

Optionally, referring to FIG. 5 and FIG. 7 to FIG. 10, the direction of extension of the second line segment X2 is different from both of the direction of extension of the first line segment X1 and the direction of extension of the third line segment X3. The direction of extension of the fifth line segment X5 is different from both of the direction of extension of the fourth line segment X4 and the direction of extension of the sixth line segment X6. Accordingly, none of the first sub-transmission lines and the second sub-transmission lines is a straight line, which effectively increases the actual lengths in the first direction of the first sub-transmission lines and the second sub-transmission lines, and accordingly effectively increases the actual lengths in the first direction of the first transmission line and the second transmission line. Therefore, more first branches can be provided in the first transmission line having the higher length, and more second branches can be provided in the second transmission line, thereby effectively enlarging the electric field between the first branches and the second branches and the reference electrode, which increases the phase-shift amount, and can realize miniaturization of the tunable phase shifter.

Optionally, referring to FIG. 8, the second line segment X2 directly contacts both of the first line segment X1 and the third line segment X3. The fifth line segment X5 directly contacts both of the fourth line segment X4 and the sixth line segment X6. Accordingly, because it is not required to provide an arc-shaped curving angle that requires a precise processing, there can be a low requirement on the processing precision and a high tolerance.

The angles at which the second line segment directly contacts both of the first line segment and the third line segment and the fifth line segment directly contacts both of the fourth line segment and the sixth line segment are not particularly limited herein. As an example, all of the angle at which the second line segment and the first line segment directly contact, the angle at which the second line segment and the third line segment directly contact, the angle at which the fifth line segment and the fourth line segment directly contact and the angle at which the fifth line segment and the sixth line segment directly contact may be equal. Alternatively, all of the angle at which the second line segment and the first line segment directly contact, the angle at which the second line segment and the third line segment directly contact, the angle at which the fifth line segment and the fourth line segment directly contact and the angle at which the fifth line segment and the sixth line segment directly contact may be unequal. Alternatively, the angle at which the second line segment and the first line segment directly contact, the angle at which the second line segment and the third line segment directly contact, the angle at which the fifth line segment and the fourth line segment directly contact and the angle at which the fifth line segment and the sixth line segment directly contact may be partially equal. FIG. 8 illustrates by taking the case as an example in which all of the angle at which the second line segment and the first line segment directly contact, the angle at which the second line segment and the third line segment directly contact, the angle at which the fifth line segment and the fourth line segment directly contact and the angle at which the fifth line segment and the sixth line segment directly contact are equal and are a right angle.

Optionally, referring to FIG. 8, the direction of extension of the first line segment X1 and the direction of extension of the third line segment X3 are parallel, and the direction of extension of the second line segment X2 is perpendicular to both of the direction of extension of the first line segment X1 and the direction of extension of the third line segment X3. The direction of extension of the fourth line segment X4 and the direction of extension of the sixth line segment X6 are parallel, and the direction of extension of the fifth line segment X5 is perpendicular to both of the direction of extension of the fourth line segment X4 and the direction of extension of the sixth line segment X6. Accordingly, the first sub-transmission line and the second sub-transmission line form the coupled transmission lines having the perpendicular turning elements. The structure of the coupled transmission lines can be simply and easily processed, does not require providing an arc-shaped curving angle that requires a precise processing, and has a low requirement on the processing precision and a high tolerance.

Optionally, referring to FIG. 5, FIG. 7 and FIG. 9 to FIG. 10, the first sub-transmission line further includes a first turning corner 11 and a second turning corner 12, one end of the second line segment X2 is electrically connected to the first line segment X1 by the first turning corner 11, and the other end is electrically connected to the third line segment X3 by the second turning corner 12. The second sub-transmission line further includes a third turning corner 13 and a fourth turning corner 14, one end of the fifth line segment X5 is electrically connected to the fourth line segment X4 by the third turning corner 13, and the other end is electrically connected to the sixth line segment X6 by the fourth turning corner 14.

All of the shapes, the lengths and the widths of the first turning corner, the second turning corner, the third turning corner and the fourth turning corner are not particularly limited herein. As an example, all of the shapes, the lengths and the widths of the first turning corner, the second turning corner, the third turning corner and the fourth turning corner may be the same. Alternatively, all of the shapes, the lengths and the widths of the first turning corner, the second turning corner, the third turning corner and the fourth turning corner may be different. Alternatively, the shapes, the lengths and the widths of the first turning corner, the second turning corner, the third turning corner and the fourth turning corner may be partially the same. FIG. 5 illustrates by taking the case as an example in which all of the first turning corner, the second turning corner, the third turning corner and the fourth turning corner are an arc-shaped bending part, and all of the lengths and the widths of the first turning corner, the second turning corner, the third turning corner and the fourth turning corner are not equal.

In the tunable phase shifter according to the embodiments of the present application, the configuration that none of the first sub-transmission lines and the second sub-transmission lines is a straight line effectively increases the actual lengths in the first direction of the first sub-transmission lines and the second sub-transmission lines, and accordingly effectively increases the actual lengths in the first direction of the first transmission line and the second transmission line. Because the first branches and the second branches can be provided at all of the bending parts and the non-bending parts, more first branches can be provided in the first transmission line having the higher length, and more second branches can be provided in the second transmission line. The bending parts can enlarge the area of the intersecting or overlapping dielectric, whereby the electric field between the first branches and the second branches and the reference electrode is enlarged, which effectively increases the phase-shift amount. Moreover, the bending parts can enable the tunable phase shifter to have a compact structure, which is of significance for realizing miniaturization of the system. Accordingly, by using the second line segment, the first sub-transmission lines have a turning element, and by using the fifth line segment, the second sub-transmission lines have a turning element. Accordingly, the phase-shift amount of the tunable phase shifter is increased, thereby improving the performance of the tunable phase shifter. Moreover, the turning elements have a flexible design, and can be easily processed and fabricated.

Optionally, referring to FIG. 10, the width d1 in a first direction (the direction OA shown in the figure) of the orthographic projection of the second line segment X2 on the first substrate is greater than both of the widths d2 in a second direction of the orthographic projections of the first line segment X and the third line segment X on the first substrate. The width d3 in the first direction of the orthographic projection of the fifth line segment X on the first substrate is greater than both of the widths d4 in the second direction (the direction OB shown in the figure) of the orthographic projections of the fourth line segment X and the sixth line segment X on the first substrate. The first direction and the second direction are perpendicular. Accordingly, the line widths of the turning element and the third line segment in the first sub-transmission line are unequal to both of the line widths of the first line segment and the second line segment, and the line widths of the turning element and the fifth line segment in the second sub-transmission line are unequal to both of the line widths of the fourth line segment and the sixth line segment, whereby the structure of the coupled transmission line of the unequal line widths is formed, which can reduce the energy loss caused by the turning elements, to further reduce the reflectance.

Optionally, referring to FIG. 10, the radius r1 of the contour of the side of the first turning corner 11 that is away from the second sub-transmission line and the radius r2 of the contour of the side of the second turning corner 12 that is close to the second sub-transmission line are equal, and the radius r3 of the contour of the side of the first turning corner 11 that is close to the second sub-transmission line and the radius r4 of the contour of the side of the second turning corner 12 that is away from the second sub-transmission line are equal. The radius r5 of the contour of the side of the third turning corner 13 that is away from the first sub-transmission line and the radius r6 of the contour of the side of the fourth turning corner 14 that is close to the first sub-transmission line are equal, and the radius r7 of the contour of the side of the third turning corner 13 that is close to the first sub-transmission line and the radius r8 of the contour of the side of the fourth turning corner 14 that is away from the first sub-transmission line are equal. Accordingly, the bending parts can be easily fabricated, to be simply and easily implemented.

Optionally, referring to FIG. 5, FIG. 7 and FIG. 9, the radius r1 of the contour of the side of the first turning corner 11 that is away from the second sub-transmission line is less than the radius r2 of the contour of the side of the second turning corner 12 that is close to the second sub-transmission line. The radius r7 of the contour of the side of the third turning corner 13 that is close to the first sub-transmission line is greater than the radius r8 of the contour of the side of the fourth turning corner 14 that is away from the first sub-transmission line. Accordingly, the energy loss caused by the turning elements themselves can be effectively reduced, thereby reducing the reflectance, to effectively increase the phase-shift amount of the tunable phase shifter.

Optionally, referring to FIG. 9, the radius r1 of the contour of the side of the first turning corner 11 that is away from the second sub-transmission line is less than the radius r8 of the contour of the side of the fourth turning corner that is away from the first sub-transmission line, and the radius r2 of the contour of the side of the second turning corner 12 that is close to the second sub-transmission line is greater than the radius r7 of the contour of the side of the third turning corner that is close to the first sub-transmission line. Accordingly, by providing the turning elements having unequal radii and unequal angles, the energy loss caused by the turning elements themselves can be effectively reduced, thereby reducing the reflectance, to effectively increase the phase-shift amount of the tunable phase shifter.

Optionally, referring to FIG. 5 and FIG. 7, the radius r1 of the contour of the side of the first turning corner 11 that is away from the second sub-transmission line and the radius r8 of the contour of the side of the fourth turning corner 14 that is away from the first sub-transmission line are equal, and the radius r2 of the contour of the side of the second turning corner 12 that is close to the second sub-transmission line and the radius r7 of the contour of the side of the third turning corner 13 that is close to the first sub-transmission line are equal. Accordingly, by providing the turning elements having unequal radii and equal angles, the energy loss caused by the turning elements themselves can be effectively reduced, thereby reducing the reflectance, to effectively increase the phase-shift amount of the tunable phase shifter. Furthermore, the turning elements can be easily fabricated, to be simply and easily implemented.

Optionally, referring to FIG. 7, the radius r7 of the contour of the side of the third turning corner 13 that is close to the first sub-transmission line is greater than the radius r5 of the contour of the side of the third turning corner 13 that is away from the first sub-transmission line. The radius r6 of the contour of the side of the fourth turning corner 14 that is close to the first sub-transmission line is less than the radius r8 of the contour of the side of the fourth turning corner 14 that is away from the first sub-transmission line. Accordingly, because the metal widths of the turning corners themselves are greater than the width W of the transmission lines themselves, the energy loss of the electromagnetic wave caused by the turning elements themselves can be effectively reduced, thereby reducing the reflectance, to effectively increase the phase-shift amount of the tunable phase shifter.

Optionally, referring to FIG. 5, the radius r1 of the contour of the side of the first turning corner 11 that is away from the second sub-transmission line and the radius r3 of the contour of the side of the first turning corner 11 that is close to the second sub-transmission line are equal, and the radius r2 of the contour of the side of the second turning corner 12 that is close to the second sub-transmission line and the radius r4 of the contour of the side of the second turning corner 12 that is away from the second sub-transmission line are equal. The radius r5 of the contour of the side of the third turning corner 13 that is away from the first sub-transmission line and the radius r7 of the contour of the side of the third turning corner 13 that is close to the first sub-transmission line are equal, and the radius r6 of the contour of the side of the fourth turning corner 14 that is close to the first sub-transmission line and the radius r8 of the contour of the side of the fourth turning corner 14 that is away from the first sub-transmission line are equal. Accordingly, the metal widths of the first turning corner and the second turning corner themselves can be equal to the width of the first sub-transmission line itself, and the metal widths of the third turning corner and the fourth turning corner themselves can be equal to the width of the second sub-transmission line itself.

Figure 11:
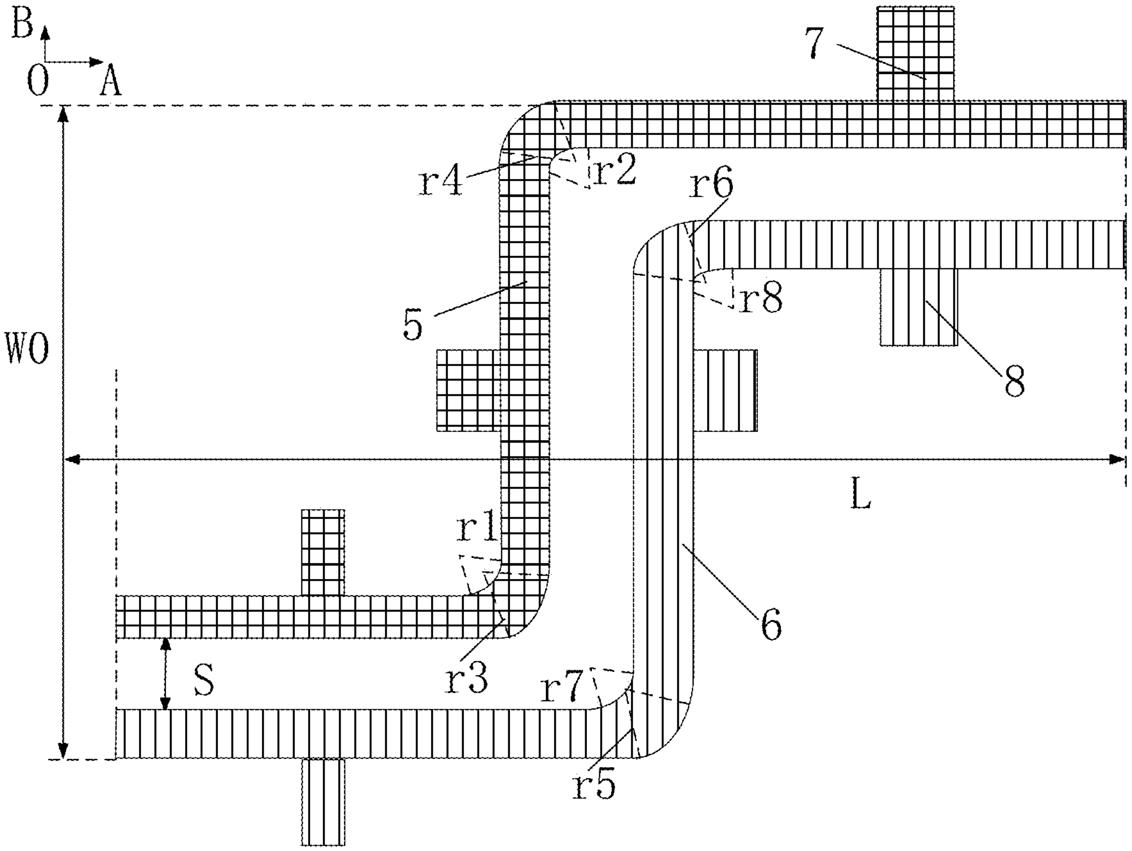
FIG. 11 is a schematic structural diagram of a sixth type of the first sub-transmission line and the second sub-transmission line according to an embodiment of the present application.

Optionally, referring to FIG. 11, the radius r1 of the contour of the side of the first turning corner 11 that is away from the second sub-transmission line is less than the radius r3 of the contour of the side of the first turning corner 11 that is close to the second sub-transmission line, and the radius r2 of the contour of the side of the second turning corner 12 that is close to the second sub-transmission line is less than the radius r4 of the contour of the side of the second turning corner 12 that is away from the second sub-transmission line.

The radius r5 of the contour of the side of the third turning corner 13 that is away from the first sub-transmission line is less than the radius r7 of the contour of the side of the third turning corner 13 that is close to the first sub-transmission line, and the radius r6 of the contour of the side of the fourth turning corner 14 that is close to the first sub-transmission line is less than the radius r8 of the contour of the side of the fourth turning corner 14 that is away from the first sub-transmission line. Accordingly, because the metal widths of the turning corners themselves are less than the width W of the transmission lines themselves, the radiation effect is increased, whereby the energy loss of the electromagnetic wave caused by the turning elements themselves is serious.

Optionally, referring to FIG. 5, FIG. 7 and FIG. 9 to FIG. 10, in the orthographic projection of one of the first sub-transmission lines on the first substrate and the orthographic projection on the first substrate of one of the second sub-transmission lines in the same direction of extension as the first sub-transmission line, the spacing W0 of the fourth line segment from the third line segment in the second direction satisfies $W0>S+2\times W$; where S is the spacing in the second direction between the orthographic projection of the first sub-transmission line on the first substrate and the orthographic projection of the second sub-transmission line on the first substrate, and W is the width in the second direction of the orthographic projection of the first sub-transmission line on the first substrate. Accordingly, the turning elements can be fabricated, to be simply and easily implemented.

Optionally, the regulatable dielectric layer includes a dielectric, and the dielectric constant of the dielectric is greater than or equal to 1.

The dielectric is not particularly limited herein. As an example, the dielectric may be a substance whose dielectric constant is variable, such as a liquid crystal.

If the dielectric is a liquid crystal, the dielectric constant of the liquid crystal is greater than 1. The particular dielectric constant of the liquid crystal may be determined according to the material of the liquid crystal, the working wave band of the tunable phase shifter and so on in practical processes.

It should be noted that, referring to FIG. 4 to FIG. 5, FIG. 7 and FIG. 9 to FIG. 10, the length in the direction OA between the first end D1 and the second end D2 of one of the first sub-transmission lines is marked as L, and both of L and W0 are less than 212.

An embodiment of the present application further provides an electronic device, and the electronic device includes the tunable phase shifter stated above.

The electronic device is suitable for various electric-circuit scenes based on glass, which is not particularly limited herein. As an example, the electronic device may include a liquid-crystal phase shifter.

The electronic device according to the embodiments of the present application can realize good characteristics such as a small size, high-efficiency integration and a high phase-shift amount, greatly simplifies the fabricating process, and reduces the difficulty in the fabrication, to be simply and easily implemented.

The description provided herein describes many concrete details. However, it can be understood that the embodiments of the present application may be implemented without those concrete details. In some of the embodiments, well-known processes, structures and techniques are not described in detail, so as not to affect the understanding of the description.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A tunable phase shifter, wherein the tunable phase shifter comprises:

a first substrate and a second substrate, wherein the first substrate and the second substrate face each other;

a regulatable dielectric layer provided between the first substrate and the second substrate;

a first electrode layer provided between the first substrate and the regulatable dielectric layer, wherein the first electrode layer comprises a reference electrode; and a second electrode layer provided between the second substrate and the regulatable dielectric layer, wherein the second electrode layer comprises a first transmission line and a second transmission line, the first transmission line is provided with a first branch, the second transmission line is provided with a second branch, and orthographic projections on the first substrate of the first branch and the second branch and an orthographic projection of the reference electrode on the first substrate at least partially overlap, wherein the first electrode layer is used as the reference electrode, and the orthographic projection of the reference electrode on the first substrate and an orthographic projection of the regulatable dielectric layer on the first substrate at least partially overlap, and wherein the reference electrode is provided at a whole surface.

2. The tunable phase shifter according to claim 1, wherein the reference electrode has a plurality of penetrating grooves, and an outer contour of an orthographic projection of the first transmission line on the first substrate and an outer contour of an orthographic projection of the second transmission line on the first substrate at least partially coincide with regions encircled by orthographic projections of outer contours of the grooves on the first substrate.

3. The tunable phase shifter according to claim 2, wherein at least some of the grooves are communicated.

4. The tunable phase shifter according to claim 2, wherein each two neighboring instances of the grooves are separated, two neighboring instances of the grooves share one supporting part, and part of an area of the supporting part serves as side walls of the grooves.

5. The tunable phase shifter according to claim 4, wherein an orthographic projection on the first substrate of a part of the first branch that is connected to the first transmission line and an orthographic projection on the first substrate of a part of the second branch that is connected to the second transmission line at least partially overlap with an orthographic projection of the supporting part on the first substrate.

6. The tunable phase shifter according to claim 5, wherein both of an outer contour of the orthographic projection on the first substrate of the part of the first branch that is connected to the first transmission line and an outer contour of the orthographic projection on the first substrate of the part of the second branch that is connected to the second transmission line coincide with an outer contour of the orthographic projection of the supporting part on the first substrate.

7. The tunable phase shifter according to claim 1, wherein both of outer contours of the orthographic projections on the first substrate of the first branch and the second branch coincide with an outer contour of the orthographic projection of the reference electrode on the first substrate.

8. A tunable phase shifter, wherein the tunable phase shifter comprises:

a first substrate and a second substrate, wherein the first substrate and the second substrate face each other;

a regulatable dielectric layer provided between the first substrate and the second substrate;

a first electrode layer provided between the first substrate and the regulatable dielectric layer, wherein the first electrode layer comprises a reference electrode; and a second electrode layer provided between the second substrate and the regulatable dielectric layer, wherein the second electrode layer comprises a first transmission line and a second transmission line, the first transmission line is provided with a first branch, the second transmission line is provided with a second branch, and orthographic projections on the first substrate of the first branch and the second branch and an orthographic projection of the reference electrode on the first substrate at least partially overlap, wherein a direction of extension of the first transmission line and a direction of extension of the second transmission line are the same; and the first transmission line comprises at least one first sub-transmission-line group, and the second transmission line comprises at least one second sub-transmission-line group.

9. The tunable phase shifter according to claim 8, wherein the first sub-transmission-line group comprises two first sub-transmission lines, each of the first sub-transmission lines comprises a first end and a second end, and the second end of one of the first sub-transmission lines and the second end of the other of the first sub-transmission lines are directly connected; and the second sub-transmission-line group comprises two second sub-transmission lines, each of the second sub-transmission lines comprises a third end and a fourth end, and the fourth end of one of the second sub-transmission lines and the fourth end of the other of the second sub-transmission lines are directly connected.

10. The tunable phase shifter according to claim 9, wherein each of the first sub-transmission lines comprises a first line segment, a second line segment and a third line segment, and the first line segment is electrically connected to the third line segment by the second line segment;

an included angle between a direction of extension of the first line segment and a direction of extension of the second line segment is unequal to an included angle between a direction of extension of the third line segment and the direction of extension of the second line segment;

each of the second sub-transmission lines comprises a fourth line segment, a fifth line segment and a sixth line segment, and the fourth line segment is electrically connected to the sixth line segment by the fifth line segment; and an included angle between a direction of extension of the fourth line segment and a direction of extension of the fifth line segment is unequal to an included angle between a direction of extension of the sixth line segment and the direction of extension of the fifth line segment.

11. The tunable phase shifter according to claim 10, wherein the included angle between the direction of extension of the first line segment and the direction of extension of the second line segment is greater than the included angle between the direction of extension of the third line segment and the direction of extension of the second line segment; and the included angle between the direction of extension of the fourth line segment and the direction of extension of the fifth line segment is greater than the included angle between the direction of extension of the sixth line segment and the direction of extension of the fifth line segment.

12. The tunable phase shifter according to claim 9, wherein each of the first sub-transmission lines comprises a first line segment, a second line segment and a third line segment, and the first line segment is electrically connected to the third line segment by the second line segment;

an included angle between a direction of extension of the first line segment and a direction of extension of the second line segment is equal to an included angle between a direction of extension of the third line segment and the direction of extension of the second line segment;

each of the second sub-transmission lines comprises a fourth line segment, a fifth line segment and a sixth line segment, and the fourth line segment is electrically connected to the sixth line segment by the fifth line segment; and an included angle between a direction of extension of the fourth line segment and a direction of extension of the fifth line segment is equal to an included angle between a direction of extension of the sixth line segment and the direction of extension of the fifth line segment.

13. The tunable phase shifter according to claim 10, wherein the direction of extension of the second line segment is different from both of the direction of extension of the first line segment and the direction of extension of the third line segment; and the direction of extension of the fifth line segment is different from both of the direction of extension of the fourth line segment and the direction of extension of the sixth line segment.

14. The tunable phase shifter according to claim 13, wherein the second line segment directly contacts both of the first line segment and the third line segment; and the fifth line segment directly contacts both of the fourth line segment and the sixth line segment.

15. The tunable phase shifter according to claim 14, wherein the direction of extension of the first line segment and the direction of extension of the third line segment are parallel, and the direction of extension of the second line segment is perpendicular to both of the direction of extension of the first line segment and the direction of extension of the third line segment; and the direction of extension of the fourth line segment and the direction of extension of the sixth line segment are parallel, and the direction of extension of the fifth line segment is perpendicular to both of the direction of extension of the fourth line segment and the direction of extension of the sixth line segment.

16. The tunable phase shifter according to claim 13, wherein the first sub-transmission line further comprises a first turning corner and a second turning corner, one end of the second line segment is electrically connected to the first line segment by the first turning corner, and the other end is electrically connected to the third line segment by the second turning corner; and the second sub-transmission line further comprises a third turning corner and a fourth turning corner, one end of the fifth line segment is electrically connected to the fourth line segment by the third turning corner, and the other end is electrically connected to the sixth line segment by the fourth turning corner.

17. A tunable phase shifter, wherein the tunable phase shifter comprises:

a first substrate and a second substrate, wherein the first substrate and the second substrate face each other;

a regulatable dielectric layer provided between the first substrate and the second substrate;

a first electrode layer provided between the first substrate and the regulatable dielectric layer, wherein the first electrode layer comprises a reference electrode; and a second electrode layer provided between the second substrate and the regulatable dielectric layer, wherein the second electrode layer comprises a first transmission line and a second transmission line, the first transmission line is provided with a first branch, the second transmission line is provided with a second branch, and orthographic projections on the first substrate of the first branch and the second branch and an orthographic projection of the reference electrode on the first substrate at least partially overlap, wherein the regulatable dielectric layer comprises a dielectric, and a dielectric constant of the dielectric is greater than or equal to 1.

* * * * *